US011263001B2

(12) United States Patent
Kurosawa et al.

(10) Patent No.: US 11,263,001 B2
(45) Date of Patent: Mar. 1, 2022

(54) CAR ONBOARD CONTROL DEVICE AND PROGRAM UPDATING SOFTWARE

(71) Applicant: HITACHI AUTOMOTIVE SYSTEMS, LTD., Hitachinaka (JP)

(72) Inventors: Kenichi Kurosawa, Ibaraki (JP); Fumiharu Nakahara, Ibaraki (JP); Yusuke Abe, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 232 days.

(21) Appl. No.: 16/477,787

(22) PCT Filed: Mar. 15, 2018

(86) PCT No.: PCT/JP2018/010158
§ 371 (c)(1),
(2) Date: Jul. 12, 2019

(87) PCT Pub. No.: WO2018/173911
PCT Pub. Date: Sep. 27, 2018

(65) Prior Publication Data
US 2019/0339963 A1    Nov. 7, 2019

(30) Foreign Application Priority Data

Mar. 24, 2017   (JP) .............................. JP2017-058395

(51) Int. Cl.
*H04L 29/08*       (2006.01)
*G06F 8/65*        (2018.01)
(Continued)

(52) U.S. Cl.
CPC ......... *G06F 8/658* (2018.02); *B60W 50/0205* (2013.01); *B60W 50/0225* (2013.01);
(Continued)

(58) Field of Classification Search
CPC ..... H04W 76/27; H04W 76/19; H04W 76/12; H04W 4/46; H04W 4/40; H04W 4/44;
(Continued)

(56) References Cited

U.S. PATENT DOCUMENTS 9,075,686 B2 *   7/2015   Alrabady ................ G06F 8/658
2004/0092255 A1   5/2004   Ji
(Continued)

FOREIGN PATENT DOCUMENTS

JP   2007-80034 A    3/2007
JP   2007-189332 A   7/2007
(Continued)

OTHER PUBLICATIONS

Mansor et al., Don't Brick Your Car: Firmware Confidentiality and Rollback for Vehicles, 10 pages (Year: 2015).*
(Continued)

*Primary Examiner* — Thuy Dao
(74) *Attorney, Agent, or Firm* — Foley & Lardner LLP

(57) ABSTRACT

A decompression and restoration unit, when differential data between a new execution program and a specific program is input, decompresses and restores the compressed specific program and rewrites the execution program as the specific program. A differential restoration unit differentially restores the new execution program from the differential data and the specific program and rewrites the specific program as the new execution program. A differential restoration unit that, when differential data between a new execution program and a specific program is input, differentially restores the new execution program from the differential data and the execution program in a memory unit and rewrites the execution program in the memory unit as the new execution program. The decompression and restoration unit decompresses and (Continued)

restores the compressed specific program and rewrites the new execution program as the specific program.

18 Claims, 13 Drawing Sheets

(51) Int. Cl.
*H04L 29/06* (2006.01)
*G06F 8/658* (2018.01)
*G06F 9/445* (2018.01)
*G07C 5/08* (2006.01)
*B60W 50/00* (2006.01)
*G06F 8/654* (2018.01)
*B60W 50/02* (2012.01)

(52) U.S. Cl.
CPC ........... *G06F 8/654* (2018.02); *G07C 5/0808* (2013.01); *B60W 2050/0083* (2013.01); *B60W 2510/1005* (2013.01)

(58) Field of Classification Search
CPC ......... H04W 4/90; H04W 4/029; H04W 4/80; H04W 4/70; H04L 67/12; G07C 5/008; G07C 5/085; G06F 17/00; G06F 11/1458; G06F 11/2056; G06F 11/2071; G06F 11/2082; G06F 8/658; G06F 8/654; B60W 50/0205; B60W 50/0225; B60W 2050/0083
See application file for complete search history.

(56) References Cited

U.S. PATENT DOCUMENTS

| 2007/0083571 A1* | 4/2007 | Meller ................... H03M 7/30 |
| 2011/0082995 A1 | 4/2011 | Enomoto |
| 2016/0026458 A1* | 1/2016 | Wist ........................ G06F 8/658 |
| | | 717/168 |
| 2018/0018160 A1 | 1/2018 | Teraoka |
| 2018/0018164 A1 | 1/2018 | Kurosawa |
| 2018/0272964 A1* | 9/2018 | Netter ................. B60R 16/0231 |

FOREIGN PATENT DOCUMENTS

| JP | 2007-323488 A | 12/2007 |
| JP | 2009-110527 A | 5/2009 |
| JP | 2011-81561 A | 4/2011 |
| JP | 2012-190075 A | 10/2012 |
| JP | 2014-182571 A | 9/2014 |
| JP | 2016-118879 A | 6/2016 |
| JP | 2016-170740 A | 9/2016 |
| WO | WO-2014/148003 A1 | 9/2014 |
| WO | WO 2016/121442 A1 | 8/2016 |

OTHER PUBLICATIONS

Extended European Search Report issued in corresponding European Patent Application No. 18771815.0 dated Nov. 25, 2020.
International Search Report with English translation and Written Opinion issued in corresponding application No. PCT/JP2018/010158 dated Jun. 26, 2018.
Office Action issued in corresponding European Patent Application No. 18771815.0 dated Oct. 20, 2021.

* cited by examiner

CAR ONBOARD CONTROL DEVICE AND PROGRAM UPDATING SOFTWARE

TECHNICAL FIELD

The present invention relates to an in-vehicle control device and program update software.

BACKGROUND ART

Reprogramming of an in-vehicle control device is performed by connecting a personal computer (PC) or in-vehicle writing device as a writing tool via a low-speed controller area network (CAN) to an in-vehicle control device (electric control unit (ECU)), and writing the whole binary data (new program) to the flash memory of the ECU while dividing and transferring it.

Therefore, even when the update part of the new program to the old program is small, the whole new program is transferred via CAN, and the whole new program is written.

Therefore, there is a problem that it takes time for writing. On the other hand, the concept of reprogramming based on difference has conventionally been proposed (for example, refer to PTL 1). That is, PTL 1 describes in paragraph [0019] "means for creating differential data between new and old programs in units of blocks" as one of rewriting methods. Further, PTL 1 states in paragraph [0064] that the old program of the update target block is transferred to an SDRAM, the new program is restored to the SDRAM using the differential data and the old program, the update target block is erased, and then the new program is written.

PTL 2 describes in paragraph [0006] a method for implementing differential update with a small amount of RAM usage. According to this method, the old program of the update target block is transferred not to the RAM but to another block of a flash memory. After the transfer, the update target block is erased, the new program is restored using the differential data and the transferred old program, and the new program is written to the update target block. The new program can be written to the flash memory by repeatedly performing this process on all update target blocks. However, if there is a new program to be written to another block, the old program has already been erased, so the conventional update using full-text data is performed.

As described above, there have been developed techniques for differential reprogramming.

CITATION LIST

Patent Literature

PTL 1: JP 2012-190075 A
PTL 2: JP 2011-81561 A
PTL 3: JP 2016-118879 A

SUMMARY OF INVENTION

Technical Problem

There are several issues with differential reprogramming. Details will be described below. A first issue will be described. In many cases, an in-vehicle control device is configured as a storage device including a non-volatile memory of several megabytes and a small volatile memory of one megabyte or less. This is to achieve an inexpensive in-vehicle control device by implementing control only with a memory built in a microcomputer. Therefore, with an old program and differential data stored in the non-volatile memory as input, a new program is differentially restored by differential restoration software, and the new program is written to the non-volatile memory to implement software update.

However, it is necessary to diagnose whether the restored new program has been restored correctly. The diagnosis is performed, for example, such that the sum value and hash value of the whole new program are received from the writing tool or the in-vehicle writing device, the sum value and the hash value of the new program restored by the in-vehicle control device are calculated, and it is checked whether the calculated values match the received values.

The first issue is that if the diagnostic result is abnormal, differential reprogramming becomes impossible because the old program no longer exists in the non-volatile memory. The first object is to provide a method for solving this problem inexpensively and safely.

PTL 3 does not mention a program rewriting method by differential update (differential reprogramming) but discloses a method by which the previous version of a program is always compressed and stored in a second memory, and in the event of an abnormality in reprogramming of the old program in a first memory, the compressed data in the second memory is decompressed and the previous version of the program is written to the first memory, thereby enabling a microcomputer to operate. However, PTL 3 also states that, since it is necessary to store the previous version of the program in the compressed state in the second memory, the in-vehicle control device needs a compression means.

Next, the second issue will be described. Differential update generally generates differential data from a new program and the previous version. However, considering the case of millions of recalls, it is unlikely that every vehicle has the previous version of the program installed. If the driver does not feel an abnormality in the owned vehicle, the program has not been updated due to a recall or due to trouble such as going to the dealer in many cases. For this reason, it is necessary to prepare differential data for a plurality of versions for differential update. Therefore, there is a problem that version control becomes complicated.

The second object is to provide a means for simplifying the complexity of this version control.

Solution to Problem

In order to solve the above issues, the present invention includes as an example: a memory unit that has a rewritable execution program and a compressed specific program; a decompression and restoration unit that, when differential data between the new execution program and the specific program is input, decompresses and restores the compressed specific program and rewrites the execution program as the specific program; and a differential restoration unit that differentially restores the new execution program from the differential data and the specific program in the memory unit and rewrites the specific program in the memory unit as the new execution program.

The present invention also includes:
a memory unit that has a rewritable execution program and a compressed specific program; a differential restoration unit that, when differential data between the new execution program and the specific program is input, differentially restores the new execution program from the differential data and the execution program in the memory unit and rewrites the execution program in the memory unit as the new execution program; and a decompression and restoration unit that decompresses and restores the compressed specific program and rewrites the new execution program as the specific program.

Advantageous Effects of Invention

According to the present invention, it is possible to enhance the security of program update. It is also possible to simplify program version control.

DESCRIPTION OF EMBODIMENTS

Figure 1:
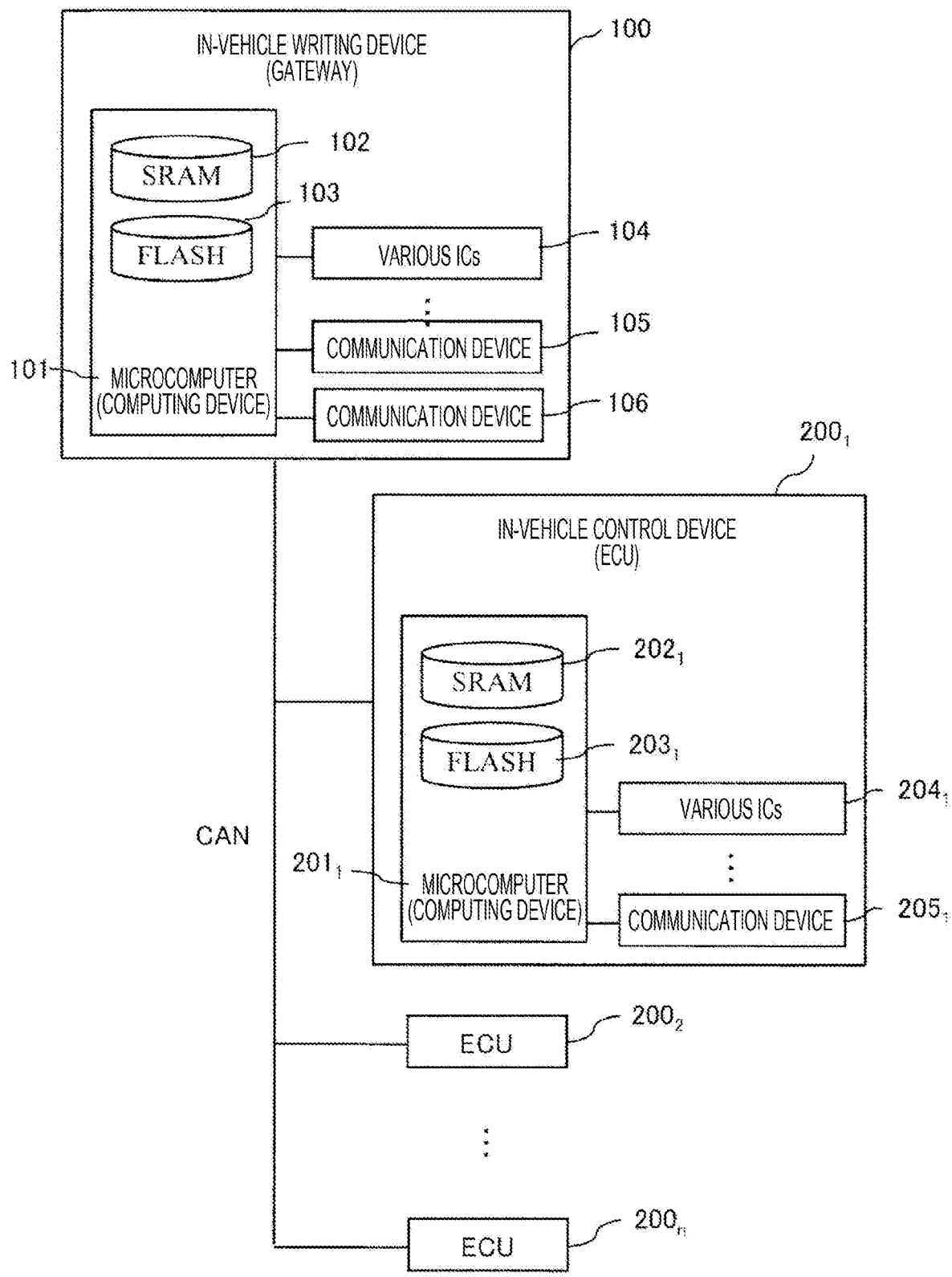
FIG. 1 is a schematic diagram illustrating an overall configuration of a vehicle according to an embodiment of the present invention.

A first solution will be described.

In the in-vehicle control device, an update target program is arranged in a first non-volatile memory, and a specific program (for example, an emergency program) is arranged in a compressed state (compressed data) in a second non-volatile. Next, a new program is differentially restored by using a differential restoration means from differential data generated from an old program and a new program and an old program in the first non-volatile memory. The restored new program is then diagnosed using a diagnostic tool. When the result of the diagnosis is normal, the program update has been correctly performed, and thus the program update process is performed. On the other hand, when the result of the diagnosis is abnormal, the compressed data is decompressed using a decompression means, and the decompressed specific program is written to the first non-volatile memory.

Operating this specific program allows the vehicle to run normally.

According to the first solution means, even when the differential update fails, the vehicle can be run by the specific program (for example, the emergency program) obtained by decompressing the compressed data. Further, the specific program can be limited to the function necessary for running and thus can be made smaller in program size. Therefore, since the compressed data becomes smaller in size, which provides the effect of decreasing the capacity of the backup non-volatile memory (the second non-volatile memory).

Next, a second solution will be described.

Before start of differential update, the in-vehicle control device decompresses the compressed data in the second non-volatile memory using the decompression means, and writes the specific program to the first non-volatile memory. Next, the in-vehicle control device differentially restores the new program from differential data generated from the specific program and the new program, and the specific program in the first non-volatile memory, using differential restoration means. The restored new program is written to the first non-volatile memory.

As described above, the present solution arranges the specific program in the first non-volatile memory in the in-vehicle control device before differential restoration, which enables differential update in all vehicles simply by preparing the differential data between the specific program and the new program.

The present solution is implemented by a combination of the decompression means and the differential restoration means. However, it is not a mere combination. Originally, restoring the new program only by using the decompression means makes it easy to change the first non-volatile memory to the new program. In many cases, however, compressed data is 10 times or more in size than differential data. For this reason, the communication time between the in-vehicle writing device and the in-vehicle control device increases, which leads to increase in software update time. On the other hand, in the present example, the decompression processing of compressed data can be performed between memories in the in-vehicle control device. Therefore, the decompression processing can be performed in a short time. Moreover, it is generally an impossible concept that decompression is performed and the first non-volatile memory is changed to the specific program before differential update. This is because the old program existing in the first non-volatile memory is a newer version than the specific program in many cases.

Therefore, it is generally an impossible concept that, first, rewriting to the older version of the specific program than the old program and then differential update is performed.

Further, there is an improvement means of the second solution.

The means for solving the second issue is to write the specific program to the first non-volatile memory using the decompression means, and then differentially restore the new program from the differential data and the specific program, and write the new program to the first non-volatile memory. Accordingly, two writes occur in the first non-volatile memory.

The improved means is a means implemented by one write. First, the decompression means decompresses a portion of the specific program from the compressed data in the second non-volatile memory and writes the same to the volatile memory. Next, the differential restoration means differentially restores the portion of the new program using differential data between the portion of the specific program and a portion of the new program and a portion of the specific program in the volatile memory. Next, the restored portion of the new program is written to the first non-volatile memory. The whole new program is written to the first non-volatile memory by repeating the decompression processing and the differential restoration processing only for this portion. As a result, the first non-volatile memory can be implemented in one write.

According to the second solution means and the improved means, the specific program (for example, the emergency program) is used instead of the old program (the first non-volatile memory) in the in-vehicle control device, and thus the differential data is generated from the specific program and the new program. That is, even if the in-vehicle control device operates on different versions of program, it is possible to perform differential update on all in-vehicle control devices only by the differential data in the present solution.

As described above, according to the present solution and the improved means, there is no need to manage differential data for a plurality of versions of program, which enables simplified management of program versions.

Hereinafter, a configuration and operation of a vehicle including the in-vehicle control device according to an embodiment of the present invention will be described with reference to the drawings.

The vehicle includes an in-vehicle writing device 100 (gateway) and a plurality of in-vehicle control devices 200 (2001 to 200n). The in-vehicle writing device 100 and the in-vehicle control devices 200 communicate with each other via an in-vehicle network CAN.

Each of the in-vehicle control devices 200 includes a microcomputer 201, various kinds of integrated circuits (ICs) 204 corresponding to the application of each of the in-vehicle control devices 200, and a communication device 205 such as a CAN transceiver. The microcomputer 201 has therein an SRAM 202 (volatile memory) and a FLASH memory 203 (non-volatile memory).

Although the in-vehicle writing device 100 is basically configured in the same manner as the in-vehicle control devices 200, the in-vehicle writing device 100 further includes a communication device corresponding to a protocol of an external network for the vehicle. That is, the in-vehicle writing device 100 includes a microcomputer 101, various ICs 104, a communication device 105 such as a CAN transceiver, and a communication device 106 corresponding to the protocol of the external network for the vehicle. The microcomputer 101 has therein an SRAM 102 and a FLASH memory 103.

Figure 2:
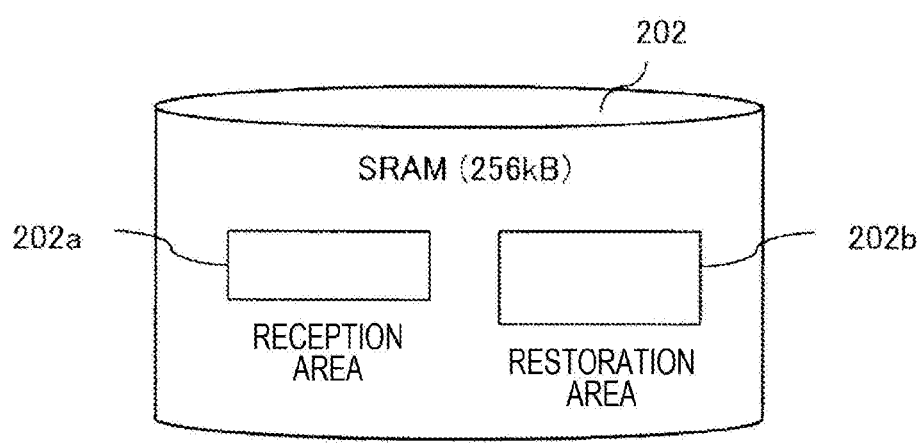
FIG. 2 is a schematic diagram illustrating an internal configuration of an SRAM in an in-vehicle control device illustrated in FIG. 1

Next, a configuration of the SRAM 202 in each of the in-vehicle control devices 200 will be described with reference to FIG. 2. FIG. 2 is a schematic diagram illustrating an internal configuration of the SRAM 202 illustrated in FIG. 1.

The SRAM 202 includes a reception area 202a for temporarily storing differential data transmitted from the in-vehicle writing device 100, and a restoration area 202b for temporarily storing a restoration program obtained by differential restoration using the differential data.

Figure 3:
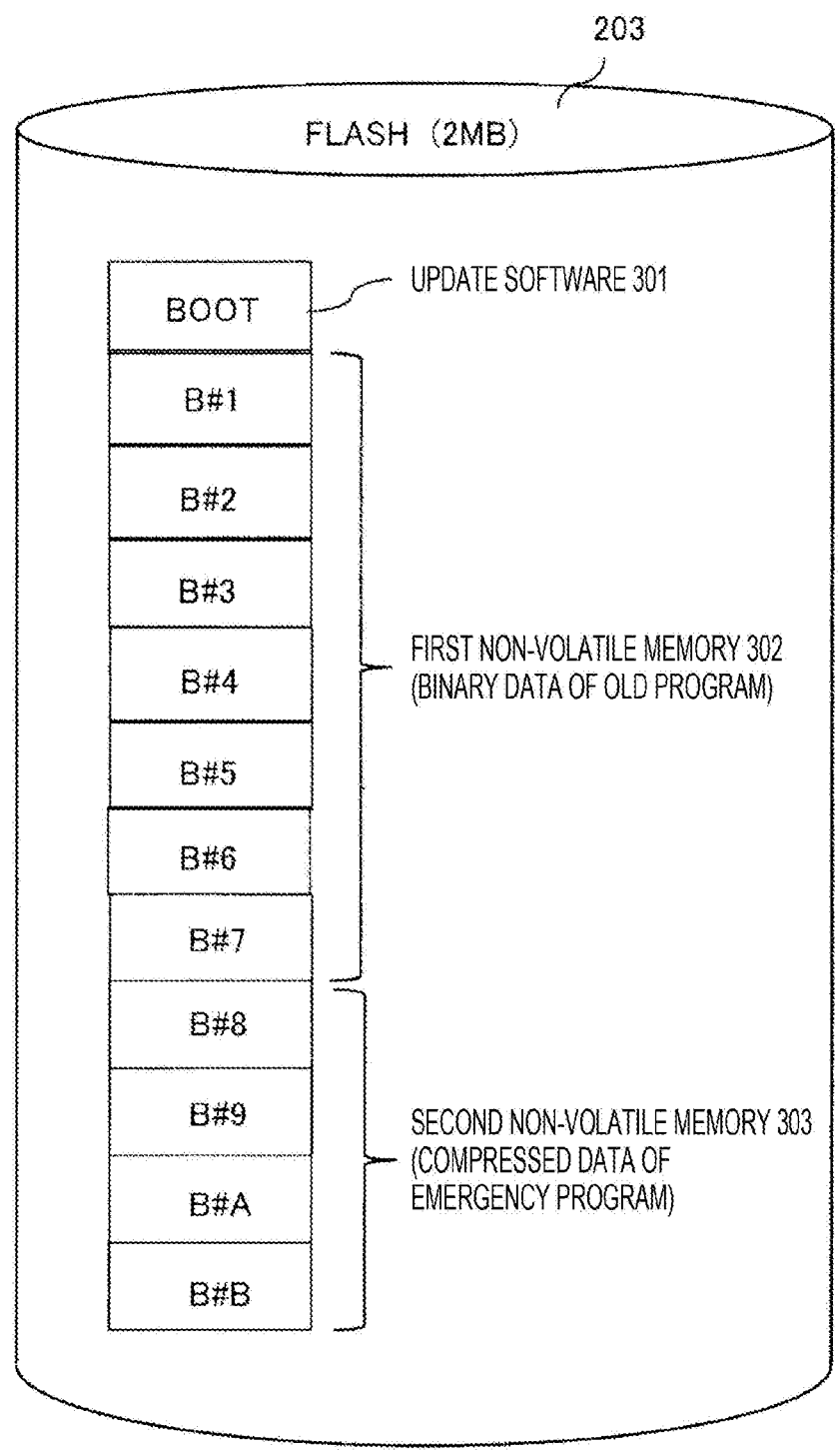
FIG. 3 is a schematic diagram illustrating an internal configuration of a FLASH memory in an in-vehicle control device illustrated in FIG. 1.

Next, a configuration of the FLASH memory 203 will be described with reference to FIG. 3. FIG. 3 is a schematic diagram illustrating an internal configuration of the FLASH memory 203 illustrated in FIG. 1. The FLASH memory 203 includes blocks B #n (n=1 to B) of a plurality of sizes and BOOT. In this example, the first non-volatile memory 302 storing an update target program (binary data) includes an area of the blocks B #n (n=1 to 7). The second non-volatile memory 303 storing compressed data of an emergency program according to the present example includes an area of blocks B #n (n=8 to B). In the present embodiment, as an example, the size of the FLASH memory 203 is 2 MB. In this example, the blocks B #n have the minimum erasable size. For example, in the case of writing data in the blocks B #n, it is necessary to erase the entire blocks B #n and then write the data.

As illustrated in FIG. 3, in the FLASH memory 203, new software 301 is installed in BOOT at the top block to communicate with the in-vehicle writing device 100 and implement the differential update.

First Example

Figure 4:
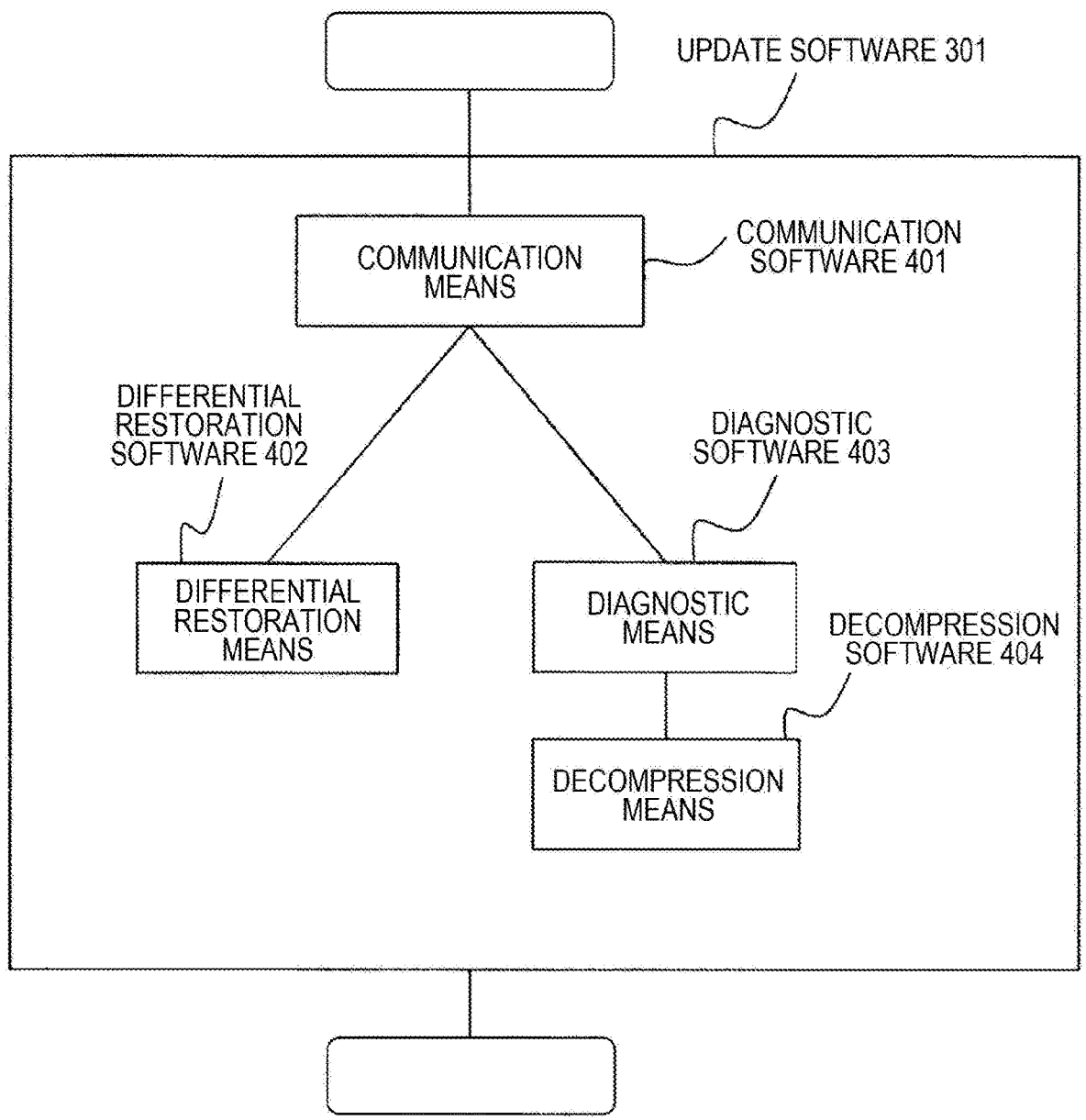
FIG. 4 is an overall configuration diagram of update software in a first example of the present invention.

Next, the operations of the update software 301 will be described with reference to FIG. 4 illustrating the overall configuration of the first example.

The update software 301 operates communication software 401 to temporarily store the differential data received from the in-vehicle writing device 100 in the reception area 202a of the SRAM 202.

Next, the update software 301 operates differential restoration software 402 to perform differential restoration using the differential data in the reception area 202a and the old program (binary data) in the first non-volatile memory 302, and stores the result in the restoration area 202b of the SRAM 202. Next, the update software 301 deletes the old program by erasing the blocks B #n (n=1 to 7) of the first non-volatile memory 302, and copies the restoration program in the restoration area 202b to the first non-volatile memory 302. Accordingly, the new program is stored in the first non-volatile memory 302. Next, diagnostic software 403 is operated to diagnose whether the new program has been correctly restored and written. When the diagnostic result is normal, the software update by differential update is completed. On the other hand, when the diagnostic result is abnormal, decompression means 404 is operated to decompress the compressed data in the second non-volatile memory 303, and the resultant emergency program is stored in the restoration area 202b of the SRAM 202. Next, the update software 301 deletes the restoration program by erasing the blocks B #n (n=1 to 7) of the first non-volatile memory 302, and copies the emergency program in the restoration area 202b to the first non-volatile memory 302. Accordingly, the emergency program can be stored in the first non-volatile memory 302.

As described above, even when the differential restoration fails as the first issue, the in-vehicle control device can be safely operated by combining the differential restoration means, the diagnostic means, and the decompression means using compressed data of the emergency program.

Hereinafter, the communication means, the differential restoration means, the diagnostic means, and the decompression means will be described in detail with reference to FIGS. 5 to 9.

Figure 5A:
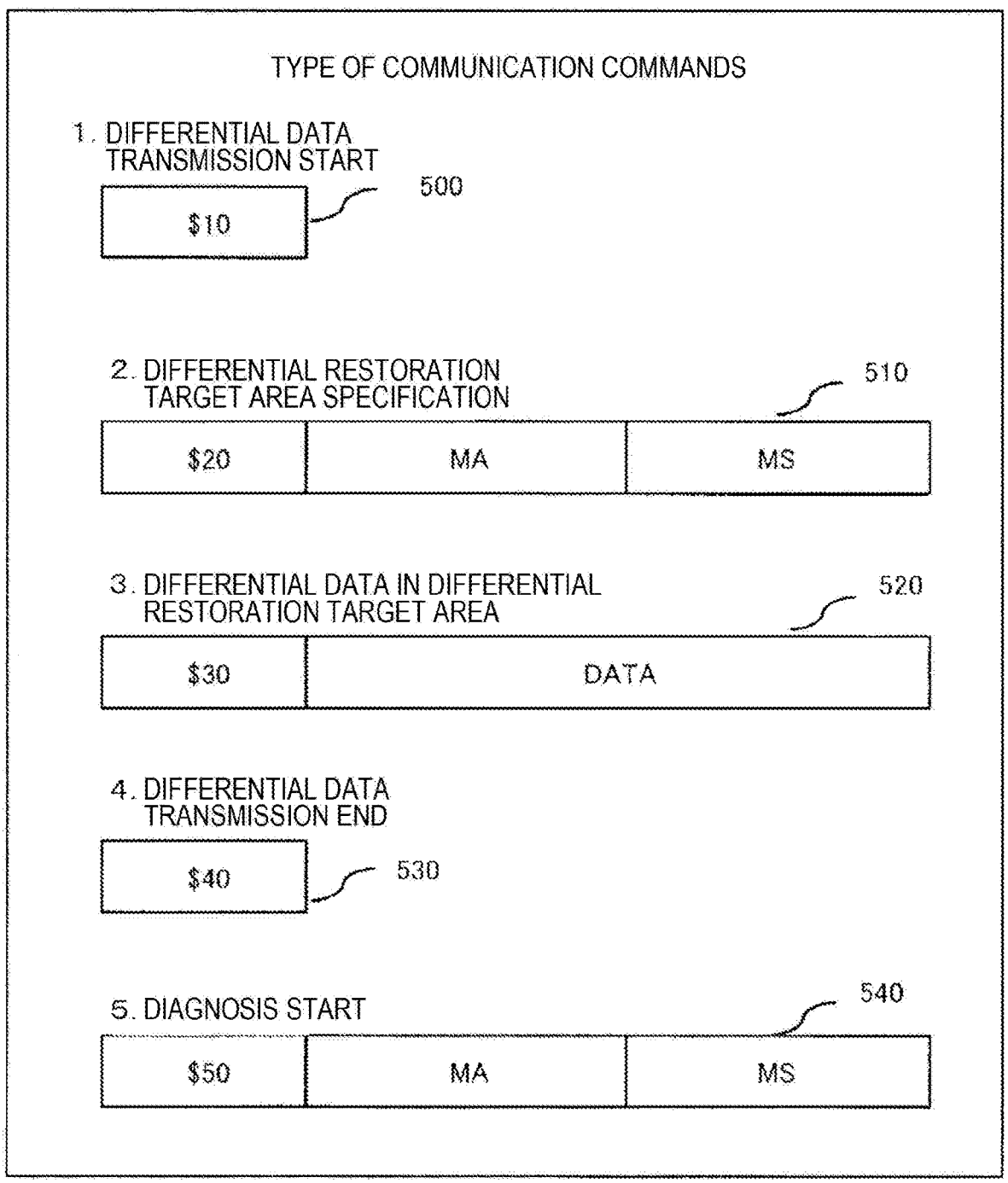
FIG. 5A is a diagram illustrating the kinds of communication commands of an in-vehicle writing device and the in-vehicle control device illustrated in FIG. 1.

FIG. 5A illustrates communication commands transmitted from the in-vehicle writing device 100. The differential data is transmitted to the in-vehicle control device 200 using the communication commands.

A communication command $10 500 is a command for notifying the in-vehicle control device 200 of the start of differential data transmission. Upon receipt of this command, the in-vehicle control device can store the differential data in the reception area 202a.

A communication command $20 510 is a differential restoration target area specification command. The command is used to specify the first non-volatile memory 302. Attached MA indicates the beginning address, and MS indicates the size.

A communication command $30 520 is a command accompanied with differential data. DATA is the differential data.

A communication command $40 530 is a command indicating the end of differential data transmission.

A communication command $50 540 is a diagnosis start command. Attached MA indicates the beginning address, and MS indicates the size. The in-vehicle control device calculates the sum value of the area of size MS from the specified beginning address MA, and diagnoses whether the sum value matches a sum value stored at a predetermined address in the first non-volatile memory 302.

Figure 5B:
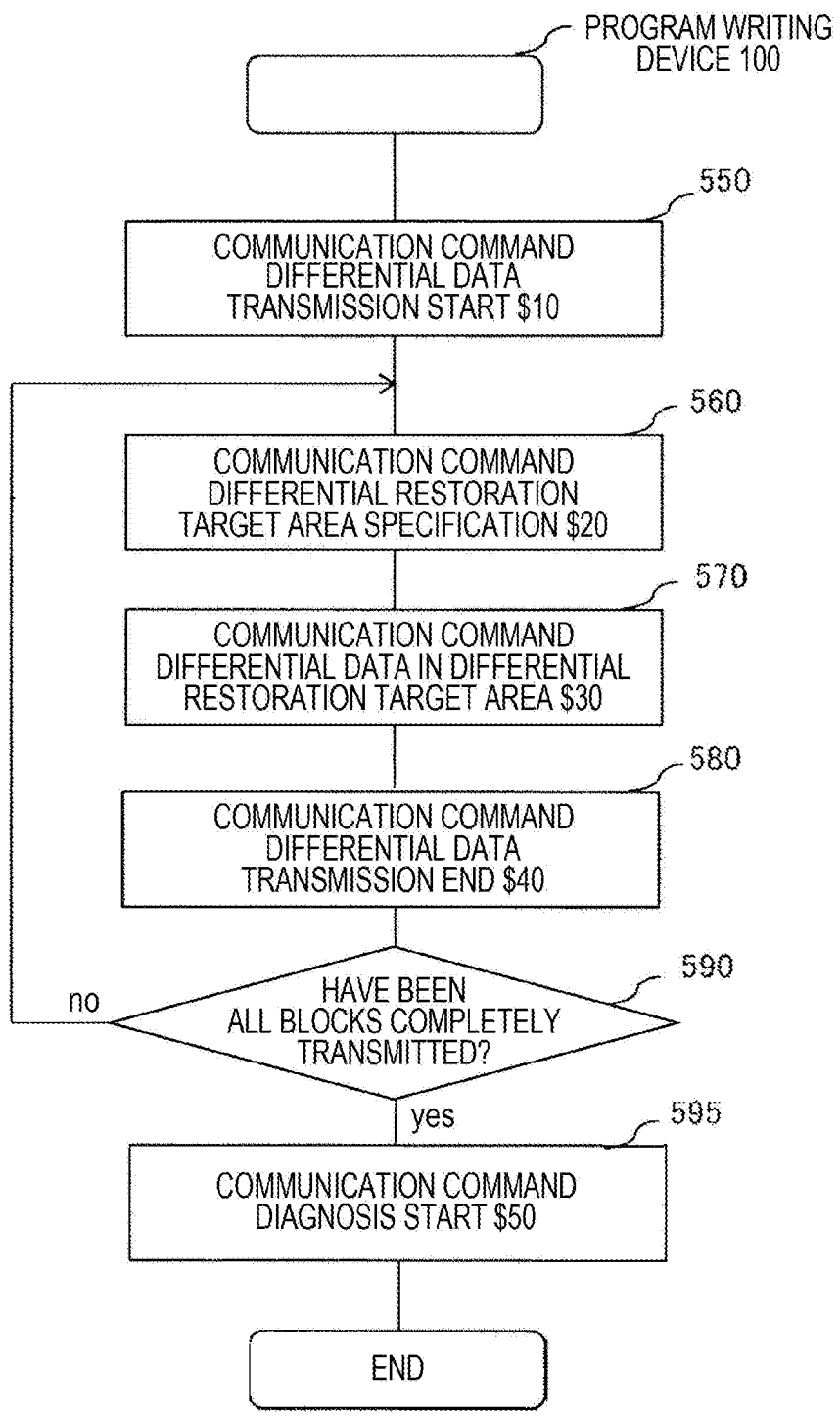
FIG. 5B is a flowchart of transmission of the communication commands illustrated in FIG. 5A by a program writing device.

FIG. 5B is a flowchart of transmission of the communication commands by the program writing device 100 to the in-vehicle control device 200.

In 550, the communication command of differential data transmission start $10 is transmitted.

In 560, the communication command of differential restoration target area specification $20 is transmitted.

In 570, the communication command of differential data $30 of the differential restoration target area is transmitted.

In 580, the communication command of differential data transmission end $40 is transmitted.

In 590, it is determined whether the differential data of all blocks have been completely transmitted. When a yes determination is made, 595 is executed. When a no determination is made, the process returns to 560 to repeatedly execute 560 to 590.

In 595, the communication command of diagnostic start $50 is transmitted.

Accordingly, the program writing device 100 has transmitted the differential data of all the blocks to the in-vehicle control device 200.

Figure 6:
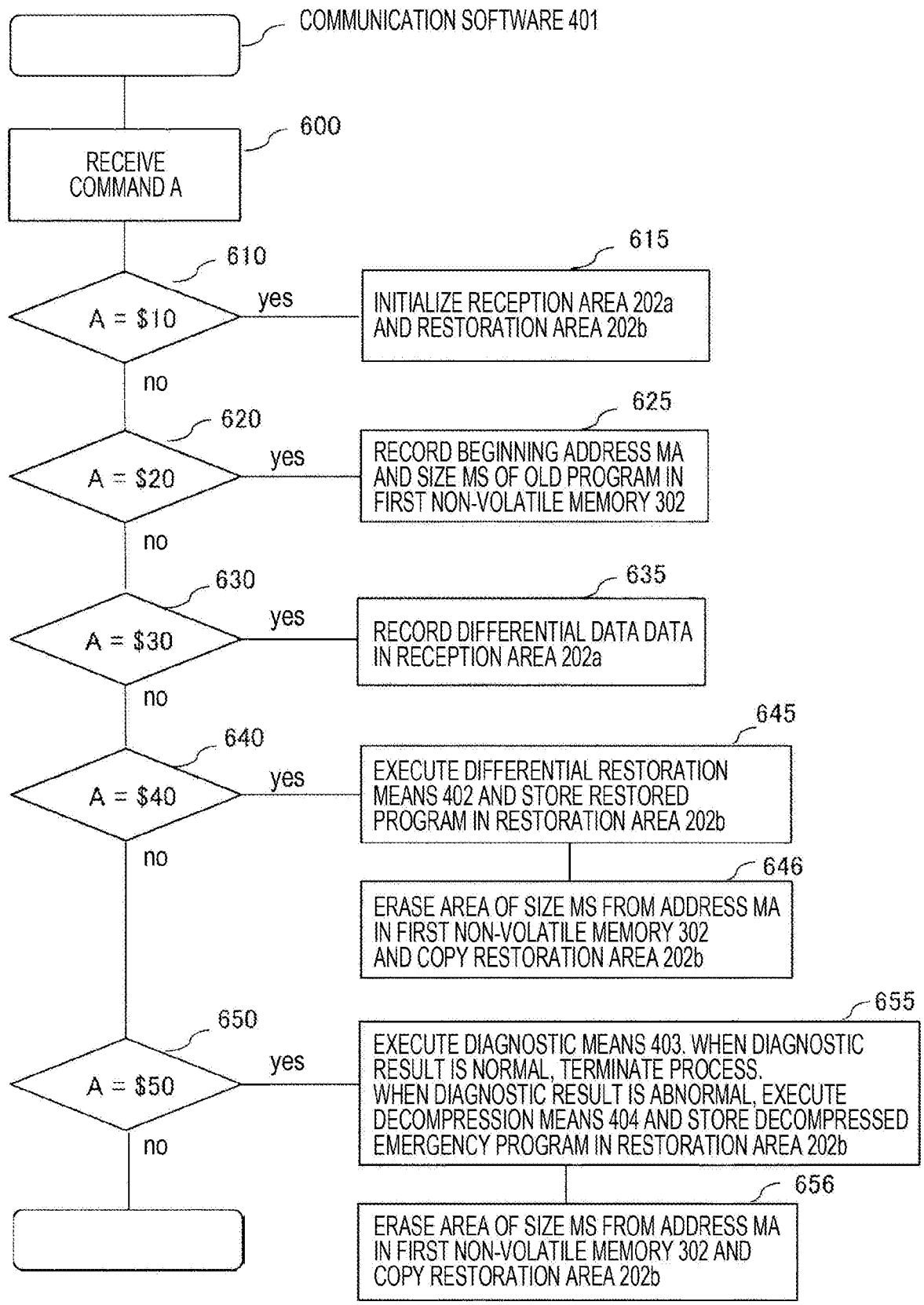
FIG. 6 is a flowchart of communication software illustrated in FIGS. 4 and 10.

FIG. 6 illustrates the operations of the communication software 401 in the in-vehicle control device 200 upon receipt of a communication command illustrated in FIG. 5.

In 600, a command A is received from the in-vehicle writing device 100.

In 610, it is determined whether the command A is $10. When a yes determination is made, 615 is executed, and when a no determination is made, 620 is executed.

In 610, the reception area 202a and the restoration area 202b are initialized to prepare for differential update.

In 620, it is determined whether the command A is $20. When a yes determination is made, 625 is executed, and when a no determination is made, 630 is executed.

In 625, the beginning address MA and the size MS of the differential restoration target area are stored.

In 630, it is determined whether the command A is $30. When a yes determination is made, 635 is executed, and when a no determination is made, 640 is executed.

In 635, the differential data is stored in the reception area 202a.

In 640, it is determined whether the command A is $40. When a yes determination is made, 645 and 646 are executed, and when a no determination is made, 650 is executed.

In 645, the differential restoration means 402 is executed and the restored program is stored in the restoration area 202b.

In 646, the area of the size MS is erased from the address MA of the first non-volatile memory 302, and the restoration area 202b is copied to the first non-volatile memory 302.

In 650, it is determined whether the command A is $50. When a yes determination is made, 655 and 656 are executed, and when a no determination is made, the process is terminated.

In 655, the diagnostic means 403 is executed. When the diagnostic result is normal, the process is terminated. However, when the diagnostic result is abnormal, the decompression means 404 is executed and the decompressed emergency program is stored in the restoration area 202b.

In 656, the area of the size MS is erased from the beginning address MA of the differential restoration target area in the first non-volatile memory 302, and the emergency program in the restoration area 202b is copied to the first non-volatile memory 302.

Accordingly, even if any abnormality has been found as a result of the diagnosis performed after the differential update, the in-vehicle control device 200 can be operated using the emergency program.

Figure 7:
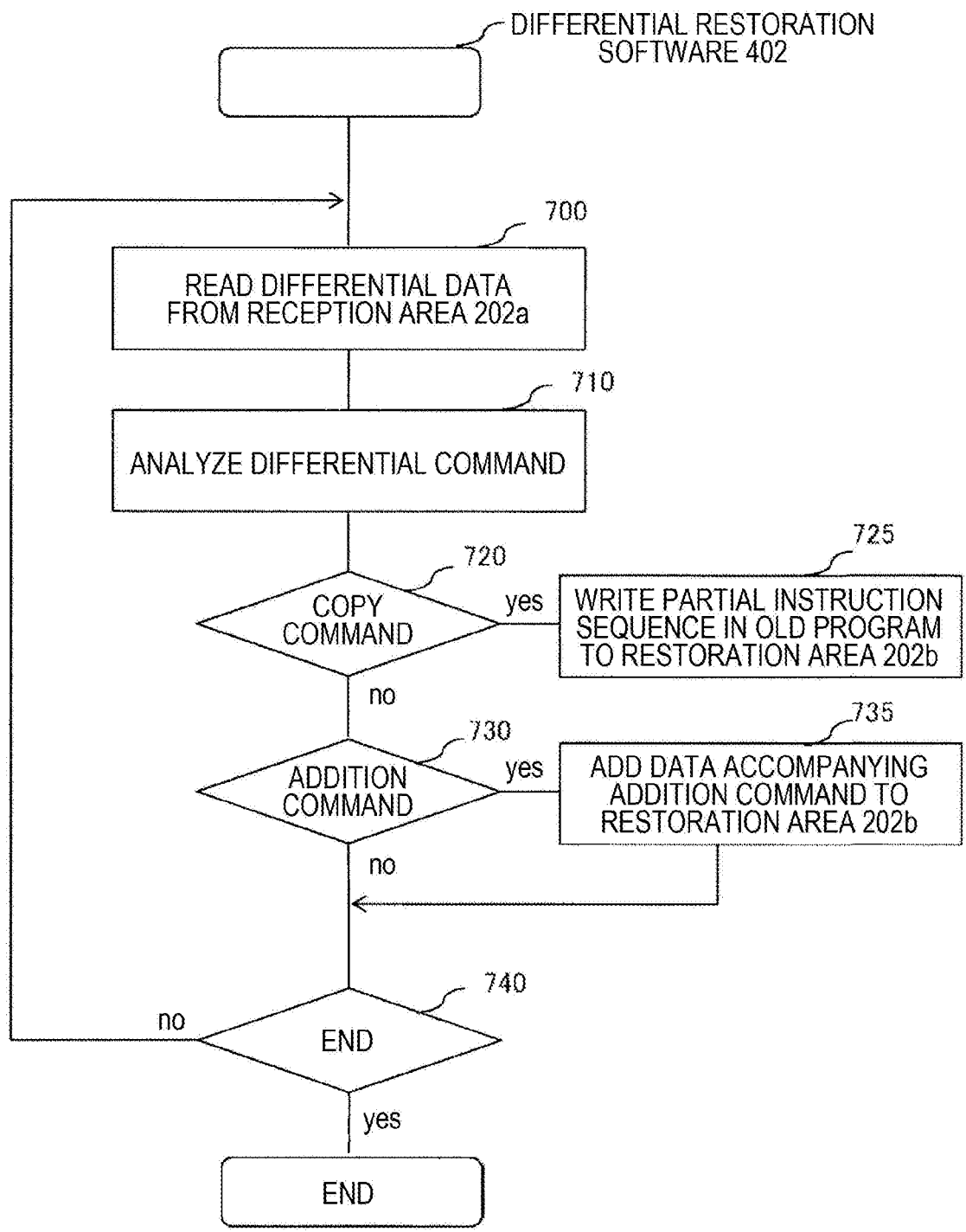
FIG. 7 is a flowchart of differential restoration software illustrated in FIGS. 4 and 10.

FIG. 7 is a flowchart illustrating the operations of the differential restoration software 402.

First, differential generation/differential restoration software will be described. In a differential extraction process or the like, the differential generation software searches an old program for a partial instruction sequence similar to a partial instruction sequence of a new program, and replaces the partial instruction sequence with a short code, and attaches the code to a copy command.

On the other hand, when a similar partial instruction sequence is not found, an addition instruction is provided with the partial instruction sequence. The sequence of the copy command and the addition command constitutes differential data. Thus, the differential data is not merely the result of subtracting the old program from the new program, but is composed of the sequence of the copy command in which the similar partial name sequence is replaced by a short code, the addition command, and others.

Based on the above preparation, the operations of the differential restoration software 402 will be described.

In 700, a differential command is read from the differential data in the reception area 202a. In 710, the differential command is analyzed, and in 720, it is determined whether the differential command is copy command. When a yes determination is made, 725 is executed, and when a no determination is made, 730 is executed.

In 725, the partial instruction sequence of the old program in the first non-volatile memory 302 is written from the code accompanying the command to the restoration area 202b.

In 730, it is determined whether the differential command is addition command. When a yes determination is made, 735 is executed, and when a no determination is made, 740 is executed.

In 735, the data (partial instruction sequence) accompanying the addition command is additionally written to the restoration area 202b.

In 740, it is determined whether all the differential data in the reception area 202a has been read out. When a yes determination is made, the differential restoration process is completed. When a no determination is made, the process returns to 700 to repeat the processing.

Thus, the differentially restored restoration program is stored in the restoration area 202b.

Figure 8:
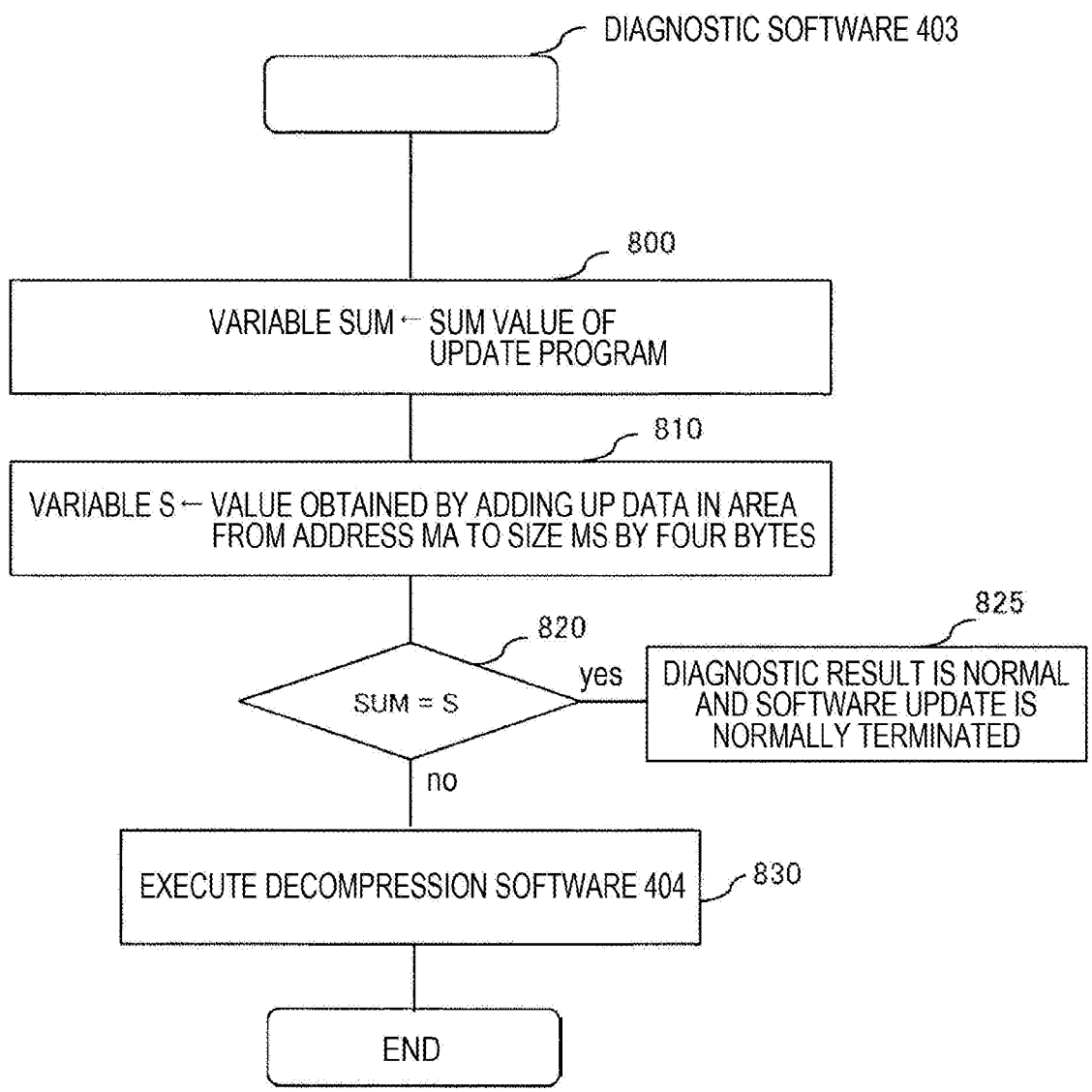
FIG. 8 is a flowchart of diagnostic software illustrated in FIGS. 4 and 10.

FIG. 8 is a flowchart of the diagnostic software 403.

In 800, the sum value of an update program stored at a specific address in the first non-volatile memory 302 is set to a variable SUM.

In 810, a value obtained by adding up data in the area from the beginning address MA to the size MS (program in the first non-volatile memory 302) by 4 bytes is set to a variable S.

In 820, it is determined whether there is a match between the variable SUM and the variable S. When a yes determination is made, 825 is executed, and when a no determination is made, 830 is executed.

In 825, the diagnostic result is normal and thus the software update is terminated normally.

In 830, the diagnostic result is abnormal, the decompression software 404 is executed.

Figure 9:
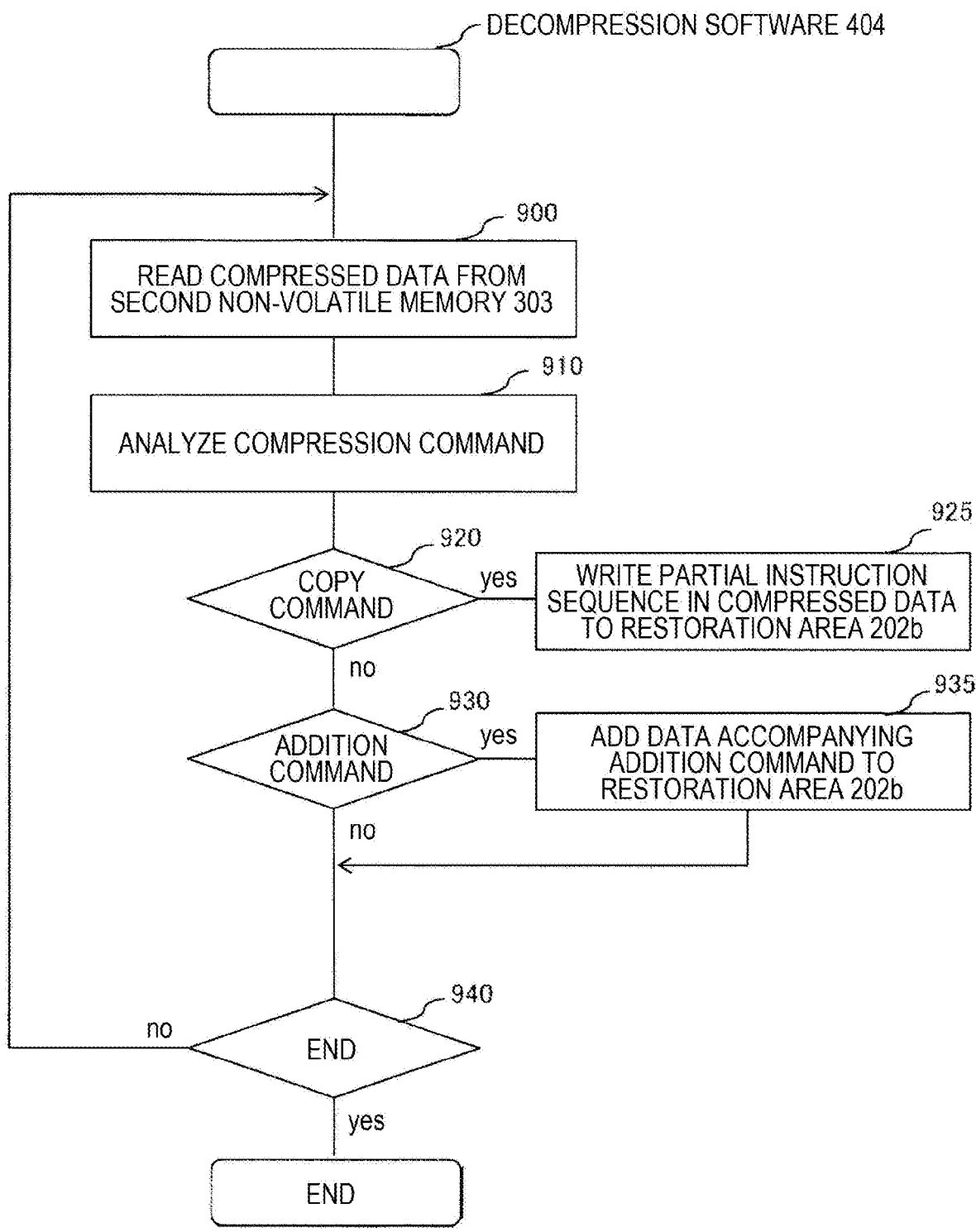
FIG. 9 is a flowchart of decompression software illustrated in FIGS. 4 and 10.

FIG. 9 is a flowchart of the decompression software 404.

First, compression and decompression software will be described. The compression software searches a program for a partial instruction sequence similar to a partial instruction sequence of a program, and replaces the partial instruction sequence with a short code, and attaches the code to a copy command. On the other hand, when a similar partial instruction sequence is not found, an addition instruction is provided with the partial instruction sequence. The sequence of the copy command and the addition command constitutes compressed data. Thus, the compressed data is composed of the sequence of the copy command in which the similar partial name sequence is replaced by a short code, the addition command, and others.

Based on the above preparation, the operations of the decompression software 404 will be described.

In 900, the compressed data is read from the second non-volatile memory 303.

In 910, the compression command is analyzed, and in 920, it is determined whether the compression command is copy command. When a yes determination is made, 925 is executed, and when a no determination is made, 930 is executed.

In 925, the partial instruction sequence in the compressed data is written from the code accompanying the command to the restoration area 202*b*.

In 930, it is determined whether the compression command is addition command. When a yes determination is made, 935 is executed, and when a no determination is made, 940 is executed.

In 935, the data (partial instruction sequence) accompanying the addition command is additionally written to the restoration area 202*b*.

In 940, it is determined whether all the compressed data has been read from the second non-volatile memory 303. When a yes determination is made, the compressed data has been decompressed in the restoration area 202*b* and thus the process is terminated. On the other hand, when a no determination is made, the process returns to 900 to repeat the processing.

The first example has been described above with reference to FIGS. 4 to 9. That is, differential update is performed by the differential restoration means 402 with the old program and the differential data in the first non-volatile memory 302 to restore the new program. When the result of the diagnosis by the diagnostic means 403 is abnormal, the compressed data of the emergency program in the second non-volatile memory 303 is decompressed by the decompression means, and the decompressed data is written to the first non-volatile memory 302, thereby making it possible to operate the in-vehicle control device 200.

Second Example

Next, as a second example, an example for simplification of software version control will be described with reference to FIG. 10.

Figure 10:
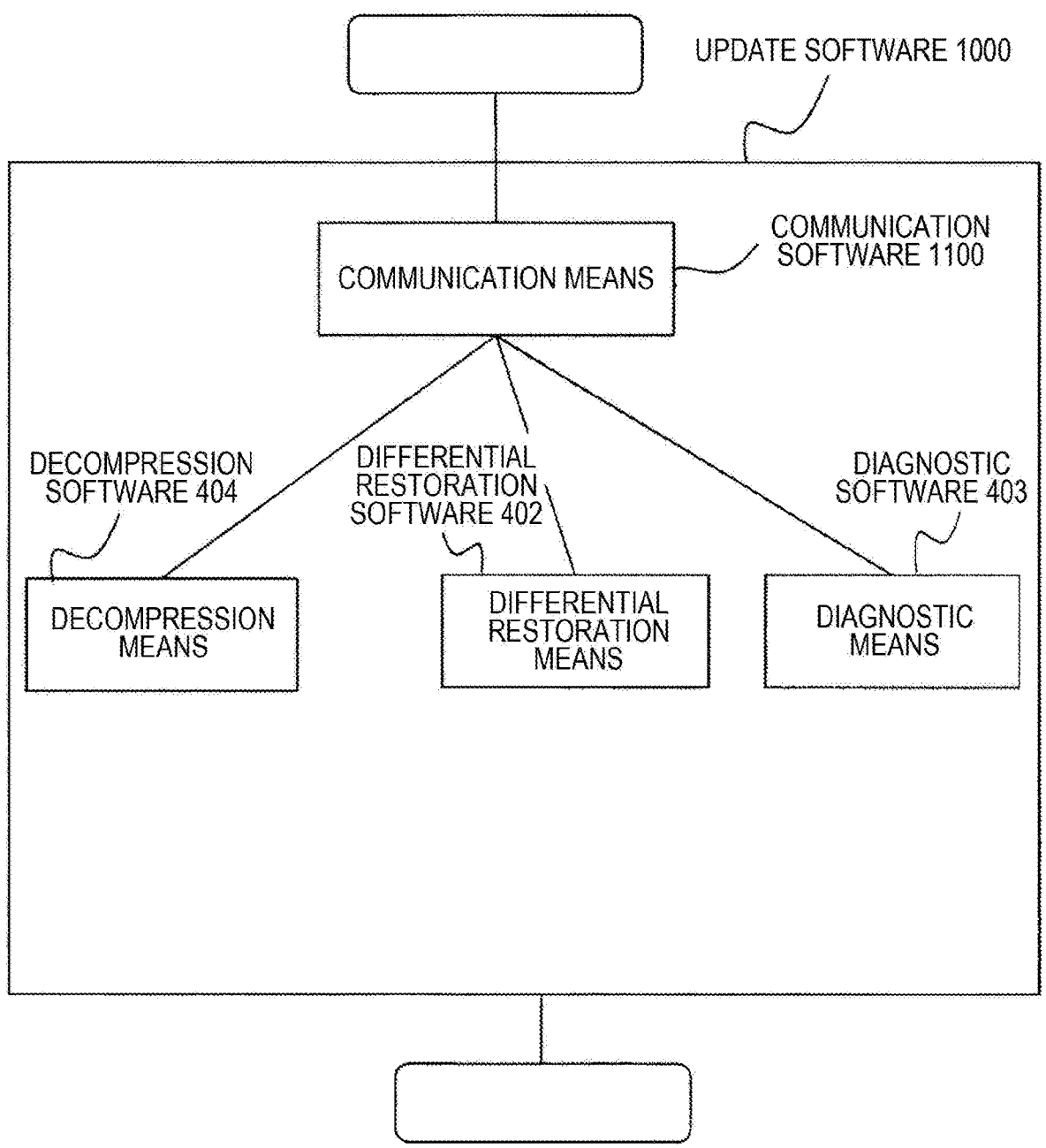
FIG. 10 is an overall configuration diagram of update software in a second example of the present invention.

Update software 1000 illustrated in FIG. 10 includes communication software 1100, decompression software 404, differential restoration software 402, and diagnostic software 403.

Figure 11:
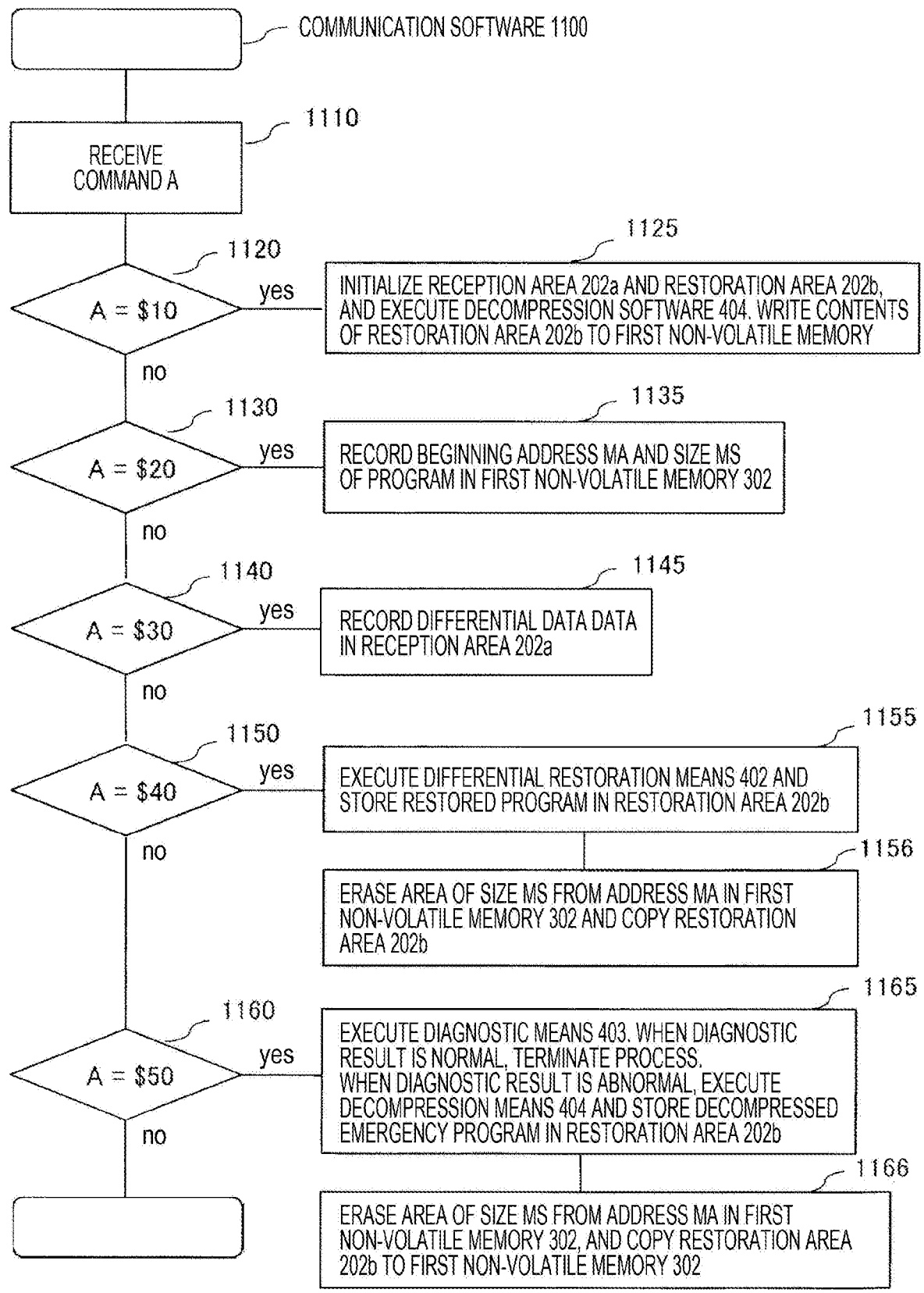
FIG. 11 is a flowchart of communication software according to the second example of the present invention.

FIG. 11 is a flowchart of the communication software 1100.

In 1110, a communication command A is received from the in-vehicle writing device 100.

In 1120, it is determined whether the command A is $10. When a yes determination is made, 1125 is executed, and when a no determination is made, 1130 is executed.

In 1125, the reception area 202*a* and the restoration area 202*b* are initialized and the decompression software 404 is executed to decompress the compressed data of the emergency program in the second non-volatile memory 303, and the emergency program is stored in the restoration area 202*b*.

Next, the first non-volatile memory 302 is erased, and then the emergency program in the restoration area 202*b* is written to the first non-volatile memory 302.

Thus, the first non-volatile memory 302 is updated to the emergency program.

In 1130, it is determined whether the command A is $20. When a yes determination is made, 1135 is executed, and when a no determination is made, 1140 is executed.

In 1135, the beginning address MA and the size MS in the differential restoration target area of the emergency program written in the first non-volatile memory 302 are stored.

In 1140, it is determined whether the command A is $30. When a yes determination is made, 1145 is executed, and when a no determination is made, 1150 is executed.

In 1145, the differential data DATA is stored in the reception area 202*a*.

In 1150, it is determined whether the command A is $40. When a yes determination is made, 1155 and 1156 are executed, and when a no determination is made, 1160 is executed.

In 1155, the differential restoration software 402 is executed to perform differential restoration using the differential data in the reception area 202*a* and the emergency program (binary data) in the first non-volatile memory 302, and the result is stored in the restoration area 202*b* of the SRAM 202.

In 1156, the emergency program is deleted by erasing the blocks B #n (n=1 to 7) in the differential restoration target area of the first non-volatile memory 302, and the restoration program in the restoration area 202*b* is copied to the differential restoration target area of the first non-volatile memory 302. Thus, the new program in the differential restoration target area is stored in the differential restoration target area of the first non-volatile memory 302.

In 1160, it is determined whether the command A is $50. When a yes determination is made, 1165 and 1166 are executed, and when a no determination is made, the process is terminated. As can be seen in FIG. 5A, $50 is a communication command issued after the completion of the differential update of all the blocks.

In 1165, the diagnostic software 403 is executed to diagnose whether the new program has been correctly restored and written. When the diagnostic result is normal, the software update by differential update is completed. On the other hand, when the diagnostic result is abnormal, the decompression means 404 is executed again and the decompressed emergency program is stored in the restoration area 202*b* of the SRAM 202.

In 1166, the first non-volatile memory 302 is erased, and then the emergency program in the restoration area 202*b* is copied again to the first non-volatile memory 302. Accordingly, the emergency program can be stored in the first non-volatile memory 302. The operations of the decompression software 404, the differential restoration software 402, and the diagnostic software 403 will not be described because they have already been described with reference to FIGS. 7 to 9.

The complexity of the differential update by software version as the second issue can be resolved by the present example in which the compressed data of the specific program is placed in advance in the second non-volatile memory 303 and then the compressed data is decompressed and written to the first non-volatile memory before differential update so that the differential update can be simply performed using only the differential data between the specific program and the new program.

Next, the second example will be described with reference to FIG. 12.

According to the basic idea of the second example, compressed data is decompressed in each block of the first non-volatile memory, the emergency program restored from the block is written to the second restoration area of the SRAM, the new program of the block is restored from the differential data between the new program and the emergency program and the data in the second restoration area, the restored new program is written to the restoration area 202b, and then the data in the restoration area 202b is written to the first non-volatile block. The second example can be implemented by repeating this process in each block.

Figure 12:
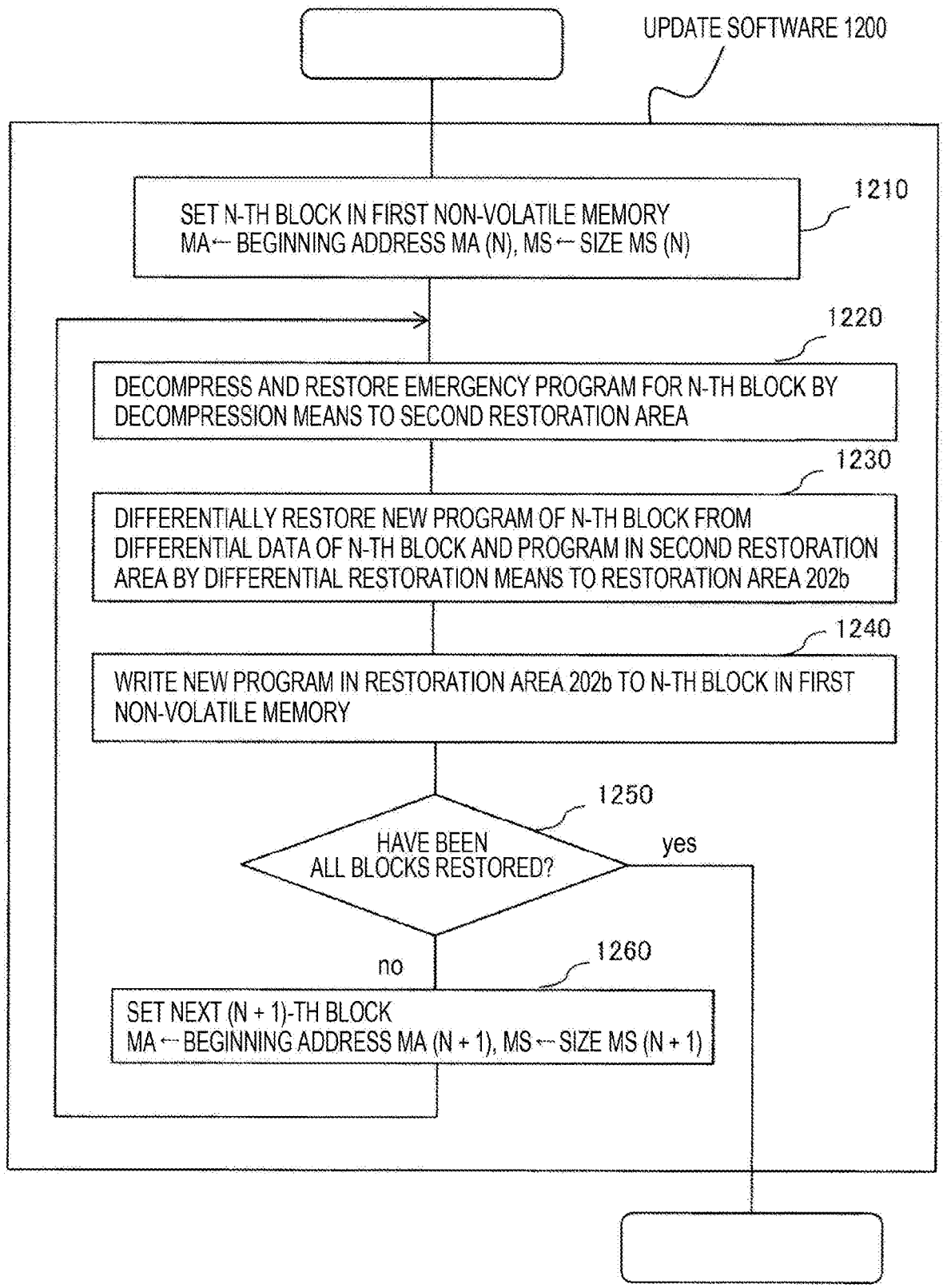
FIG. 12 is a flowchart of update software 1200 as a modification of the second example of the present invention.

FIG. 12 is a flowchart of the update software 1200.

In 1210, as a preparation for repeating the process in each block as described above, an N-th block of the first non-volatile memory is set. That is, the beginning address MA (N) of the N-th block is set to the beginning address MA, and the size MS (N) of the N-th block is set to the size MS.

In 1220, only the emergency program for the N-th block from the compressed data in the second non-volatile memory is decompressed by the decompression means, and the decompressed and restored emergency program is written to the second restoration area of the SRAM.

In 1230, the new program of the N-th block is restored from the differential data between the new program of the N-th block and the emergency program and the data in the second restoration area, and the restored new program is written to the restoration area 202b.

In 1240, the new program in the restoration area 202b is written to the N-th block in the first non-volatile memory.

In 1250, it is determined whether all the blocks have been restored. When a yes determination is made, the process is terminated. When a no determination is made, 1260 is performed.

In 1260, for restoration of the next (N+1)-th block, the beginning address of the (N+1)-th block is set to MA, the size of the (N+1)-th block is set to MS, and then 1220 is executed.

Accordingly, decompression and restoration and differential restoration are performed for each block, and the result is written to each block of the first non-volatile memory. As a result, the first non-volatile memory can be updated to the new program at one time.

REFERENCE SIGNS LIST

100 In-vehicle writing device (gateway)
101 Microcomputer (computing device)
102 SRAM (volatile memory)
103 FLASH memory (non-volatile memory)
104 Various ICs
105 Communication device (CAN protocol)
106 Communication device (network protocol outside the vehicle)
200 In-vehicle control device (ECU)
201 Microcomputer (computing device)
202 SRAM (volatile memory)
203 FLASH memory (non-volatile memory)
204 Various ICs
205 Communication device (CAN protocol)
202a Reception area
202b Restoration area
301 Update software to implement the first object stored in BOOT
302 First non-volatile memory (update target program storage area for old program and others)
303 Second non-volatile memory (compressed data storage area for emergency program)
401 Communication software to implement communication means
402 Differential restoration software to implement differential restoration means
403 Diagnostic software to implement diagnostic means
404 Decompression software to implement decompression means
500 Communication command for differential data transmission start
510 Communication command for differential restoration target area specification
520 Communication command for differential data transmission
530 Communication command for differential data transmission end
540 Communication command for diagnosis start
1000 Update software to implement second object stored in BOOT
1100 Communication software to implement second object stored in BOOT
1200 Update software for improved means to implement second object stored in BOOT

The invention claimed is:

1. An in-vehicle control device of a vehicle, the in-vehicle control device comprising:
   a memory storing a rewritable execution program and a compressed specific program; and
   at least one processor configured to:
   when differential data between a new execution program and the compressed specific program is input, decompress and restore the compressed specific program and rewrite the new execution program as the compressed specific program;
   differentially restore the new execution program from the differential data and the compressed specific program in the memory and rewrite the compressed specific program in the memory as the new execution program; and
   limit the compressed specific program to an emergency program having only functions necessary for running the vehicle.

2. The in-vehicle control device according to claim 1, wherein the at least one processor is configured to perform a diagnosis of the new execution program, and
   rewrite the new execution program as the compressed specific program depending on result of the diagnosis.

3. The in-vehicle control device according to claim 2, wherein
   the memory includes a first memory area in which the new execution program is stored and a second memory area in which the compressed specific program is stored, the at least one processor is configured to:

decompress and restore the compressed specific program in the second memory area and rewrite the new execution program in the first memory area as the compressed specific program, and differentially restore the new execution program from the differential data and the compressed specific program in the first memory area and rewrite the compressed specific program in the first memory as the new execution program.

4. The in-vehicle control device according to claim 2, wherein, the at least one processor is configured to, when a shift gear of the vehicle is in a parking position, rewrite the execution program as the new execution program.

5. The in-vehicle control device according to claim 1, wherein the at least one processor is configured to repeatedly perform processing for each section of a program.

6. An in-vehicle control device of a vehicle, the in-vehicle control device comprising:
a memory storing a rewritable execution program and a compressed specific program;
at least one processor is configured to,
when differential data between a new execution program and the compressed specific program is input, differentially restore the new execution program from the differential data and the new execution program in the memory,
rewrite the execution program in the memory as the new execution program;
decompress and restore the compressed specific program and rewrite the new execution program as the specific program; and
limit the compressed specific program to an emergency program having only functions necessary for running the vehicle.

7. The in-vehicle control device according to claim 6, wherein the at least one processor is configured to:
perform a diagnosis of the new execution program,
rewrite the new execution program as the compressed specific program depending on result of the diagnosis, and
when the diagnosis is abnormal, store the emergency program in a restoration area of the memory.

8. The in-vehicle control device according to claim 6, wherein
the memory includes a first memory area in which the new execution program is stored and a second memory area in which the compressed specific program is stored,
the at least one processor is configured to differentially restore the new execution program from the differential data and the execution program in the first memory and rewrite the execution program in the first memory as the new execution program, and
decompress and restore the compressed specific program in the second memory area and rewrite the new execution program in the first memory area as the compressed specific program.

9. The in-vehicle control device according to claim 6, wherein the at least one processor is configured to,
when a shift gear of the vehicle is in a parking position, rewrite the execution program as the new execution program, and
rewrite the new execution program as the compressed specific program depending on result of the diagnosis.

10. A non-transitory computer readable medium storing instructions for an in-vehicle control device of a vehicle, the in-vehicle control device including a memory having a rewritable execution program and a compressed specific program, the instructions, when executed by a computer, performing a method comprising:
when differential data between a new execution program and the compressed specific program is input, decompressing and restoring the compressed specific program and rewriting the new execution program as the compressed specific program;
differentially restoring the new execution program from the differential data and the compressed specific program in the memory and rewriting the compressed specific program in the memory as the new execution program; and
limiting the compressed specific program to an emergency program having only functions necessary for running the vehicle.

11. The medium according to claim 10, wherein the method comprises performing a diagnosis of the new execution program, rewriting
the new execution program as the compressed specific program depending on result of the diagnosis.

12. The medium according to claim 11, wherein
the memory includes a first memory area in which the execution program is stored and a second memory area in which the compressed specific program is stored,
the method further comprising decompressing and restoring the compressed specific program in the second memory area, rewriting the execution program in the first memory area as the compressed specific program, and restoring the new execution program from the differential data and the compressed specific program in the first memory, and rewriting the specific program in the first memory as the new execution program.

13. The medium according to claim 11, wherein the method further comprises, when a shift gear of the vehicle is in a parking position, the execution program is rewritten as the new execution program.

14. The medium according to claim 10, wherein the operations further comprise repeatedly perform processing for each section of a program.

15. A non-transitory computer readable medium storing instructions for an in-vehicle control device of a vehicle, the in-vehicle control device including a memory having a rewritable execution program and a compressed specific program, the instructions, when executed by a computer, cause operations to be carried out, the operations comprising:
when differential data between a new execution program and the compressed specific program is input, differentially restoring the new execution program from the differential data and the execution program in the memory and rewriting the execution program in the memory as the new execution program;
decompressing and restoring the compressed specific program and rewriting the new execution program as the compressed specific program; and
limiting the compressed specific program to an emergency program having only functions necessary for running the vehicle.

16. The medium according to claim 15, wherein the operations further comprise performing a diagnosis of the new execution program,
rewriting the new execution program as the compressed specific program depending on result of the diagnosis.

17. The medium according to claim 15, wherein
the memory includes a first memory area in which the new execution program is stored and a second memory area in which the compressed specific program is stored, the operations further comprising:

differentially restoring the new execution program from the differential data and the execution program in the first memory unit and rewriting the execution program in the first memory as the new execution program, and decompressing and restoring the compressed specific program in the second memory area and rewriting the new execution program in the first memory area as the compressed specific program.

18. The medium according to claim 15, wherein the operations further comprise:

when a shift gear of a vehicle is in a parking position, the execution program is rewritten as the new execution program, and rewriting the new execution program as the compressed specific program depending on result of the diagnosis.

* * * * *